Sept. 30, 1941.  G. J. MANNFOLK  2,257,613
STEERING APPARATUS
Filed March 11, 1938  2 Sheets-Sheet 1
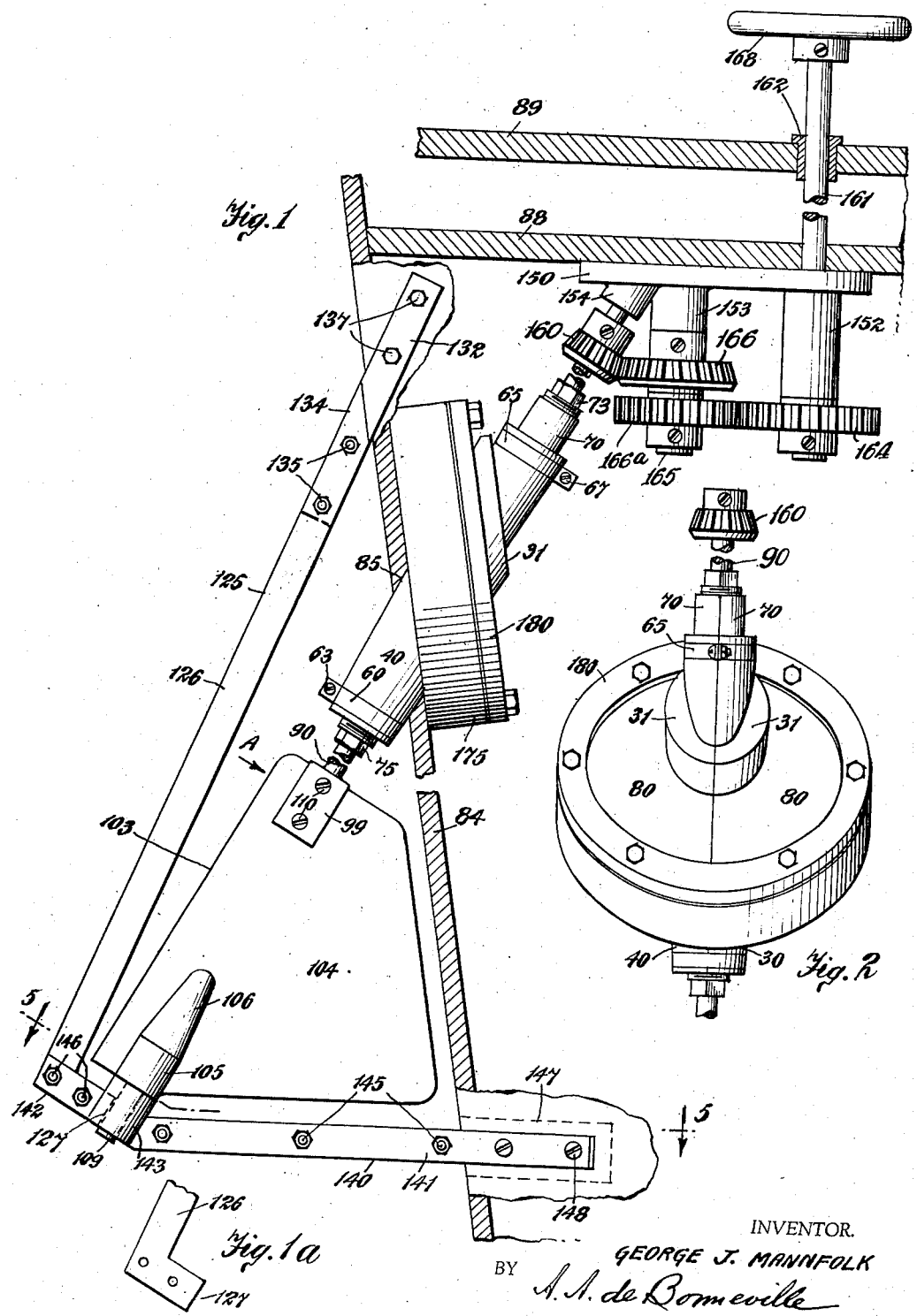
INVENTOR.
GEORGE J. MANNFOLK
BY A. A. de Bonneville
ATTORNEY.

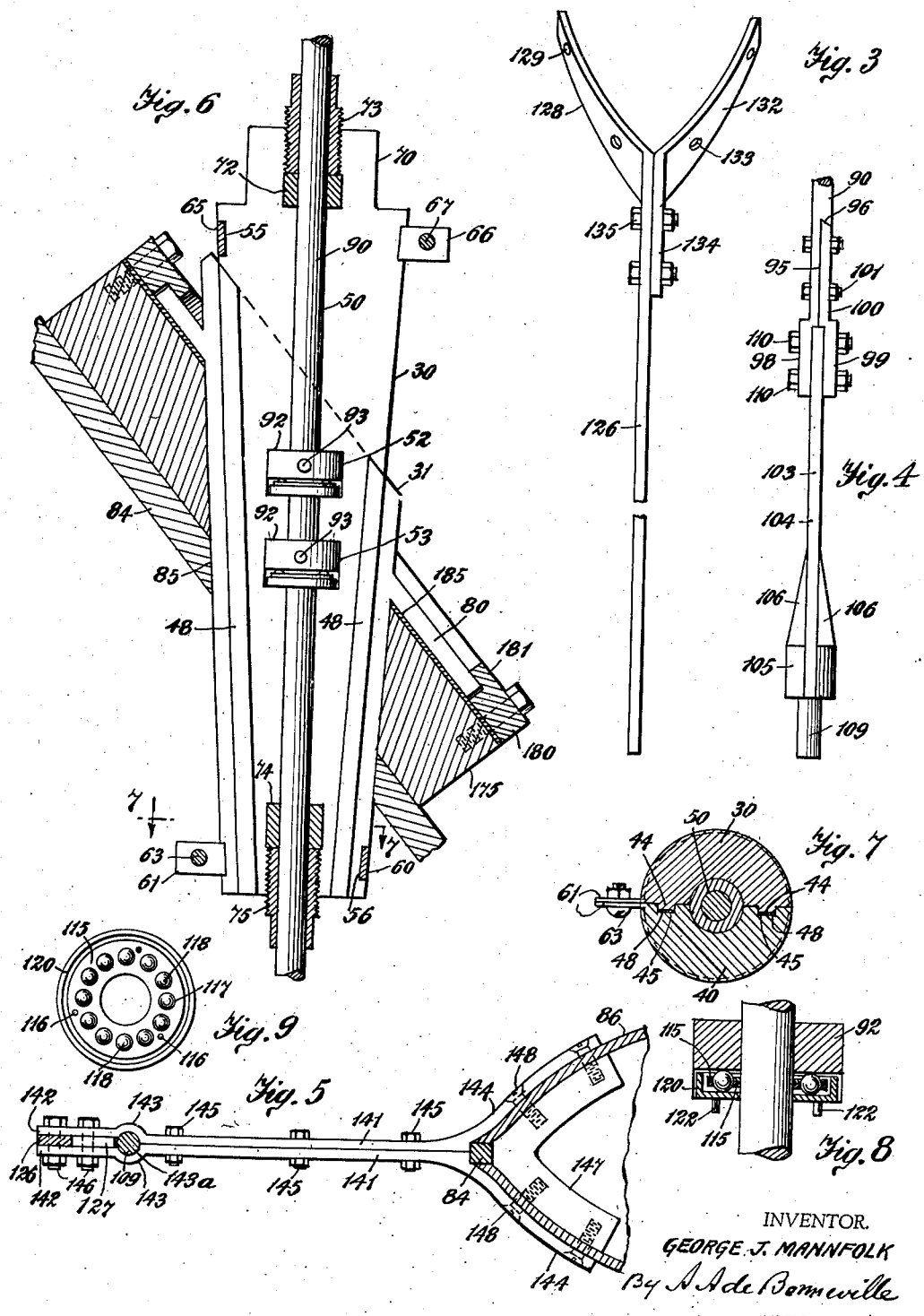

Patented Sept. 30, 1941

2,257,613

UNITED STATES PATENT OFFICE 2,257,613

STEERING APPARATUS

George J. Mannfolk, New York, N. Y.

Application March 11, 1938, Serial No. 195,266

1 Claim. (Cl. 114—154)

This invention relates to steering apparatus and is an improvement of my invention for steering apparatus described in my application filed January 25, 1938, Serial Number 186,758.

The object of the invention is the production of means detachably connected to the bow of a vessel for rotatively supporting the rudder of its steering apparatus.

The second object of the invention is the production of steering apparatus for a vessel, by means of which the rudder can be detachably connected to the rudder shaft and the support for said rudder.

The third object of the invention is the production of steering apparatus for a vessel which can quickly and easily be detached from the vessel to make any repairs therefor.

Another object of the invention comprises means whereby the supporting structure for a rudder can be easily connected to a vessel without danger of leakage of water into said vessel.

Other objects will be evident from the specification and drawings of this application.

In the drawings, Fig. 1 represents a partial vertical section through the bow of a vessel with an elevation of its steering apparatus in full lines; Fig. 1a indicates a fragmentary portion of an element of Fig. 1. Fig. 2 shows a right hand view of a portion of Fig. 1; Fig. 3 indicates a left hand view of a portion of Fig. 1; Fig. 4 represents a left hand view of the rudder of the apparatus with its shaft, viewed in the direction of the arrow A of Fig. 1; Fig. 5 shows a partial section of Fig. 1 on the line 5, 5: Fig. 6 indicates an enlarged view of one of the members of the housing for the rudder shaft with its appurtenances partly in section, and a fragmentary portion of an enlarged section through the bow of the vessel; Fig. 7 shows a section through the members of the housing of the apparatus as on the line 7, 7 of Fig. 6; Fig. 8 indicates an enlarged fragmentary portion of Fig. 6 partly in vertical section and Fig. 9 is a top view of a portion of Fig. 8.

The steering apparatus comprises a housing, consisting of a pair of tapered members 30 and 40 having the annular faces 31 adjacent to their upper ends inclined to the longitudinal axis of said members. The members 30 and 40 are positioned opposite each other and extend through the opening 85 to be described. The member 30 has a pair of longitudinal projections 44 and the member 40 has a pair of longitudinal recesses 45 that register with the projections 44. Strips of packing 48 are interposed between the projections 44 and the recesses 45. One half of a cylindrical longitudinal opening 50 is made in each of the members 30 and 40, and one half of a pair of similar cylindrical cavities 52 and 53 larger in diameter than the openings 50 and in line therewith, are provided for the members 30 and 40.

At the upper portion of both members 30 and 40 of the housing is formed on their outer surfaces a groove 55, and at the lower portions of the said members of the housing is formed a similar groove 56. In the groove 56 is detachably positioned the clamping strap 60 having the pair of projecting ends 61, and the latter are clamped together by the bolt 63. In the groove 55 is positioned a similar strap 65 having the projecting ends 66 with the bolt 67. By means of said clamping straps and their bolts, the members 30 and 40 of the housing are tightly held together and the strips of packing 48 prevent any water entering between said members.

At the upper end of each of the members 30 and 40 of the housing is indicated a one-half portion 70 of a cylindrical projection. The said one-half portions 70 are bored for the packing 72 and are threaded for the gland 73 of a stuffing box. The lower portions of the members 30 and 40 are bored for the packing 74 and are threaded for the gland 75 of a stuffing box.

From each of the members 30 and 40 and at an angle thereto extend the one-half portions 80 of a circular flange.

The numeral 84 indicates a section through the bow of a vessel with the tapered opening 85. The sheathing of the vessel is shown at 86. Decks of the vessel are shown at 88 and 89. The rudder shaft 90 extends through the openings 50 and has connected thereto the similar sleeves 92, by means of the pins 93. The sleeves 92 are seated in the cylindrical cavities 52 and 53, and thereby the rudder shaft 90 is maintained longitudinally in operative position.

The rudder shaft 90 at its lower end has a halved portion 95, with the inclined portion 96. A rectangular clamping member 98 extends from the lower end of the halved portion 95 and is laterally spaced therefrom, see Fig. 4. A detachable rectangular clamping member is indicated at 99 with the one-half cylindrical portion 100 at its upper end and which latter normally bears against the halved portion 95 and is bolted thereto by the bolts 101.

The rudder of the steering apparatus is designated in its entirety by the numeral 103 and is shown having the blade 104. A projecting hub 105 with the upper tapering portions 106 is integral with the blade 104. A pin 109 is integral with and extends from the lower end of the hub 105. The upper end of the rudder 103 is held in clamped position by the clamping members 98 and 99 and their bolts 110.

Each of the sleeves 92 bear on roller bearings. The latter each comprise the members 115 of a supporting cage, which are detachably connected to each other by the screws 116. The members 115 have each a plurality of oppositely positioned openings 117 for the ball rollers 118.

A cap shaped support 120 bears on the members 30 and 40 of the housing and is axially in line with the rudder shaft 90. The rollers 118 bear on the inner face of the bottom wall of the support 120. Pins 122 extend from the outer face of the support 120 and engage openings in the member 30 to prevent said support 120 turning. The support 120 provides a smooth surface for the ball rollers 118 to roll on.

To the outer face of the bow end of the vessel to which the steering apparatus is attached is detachably fastened the supporting bracket designated in its entirety by the numeral 125. See Figs. 1, 1a and 3.

The bracket 125 comprises the longitudinal rectangular body portion 126, which at its lower end has at right angles thereto the projecting connecting member 127. The upper end of the body portion 126 has integral therewith the curved clamping arm 128 with the openings 129. A detachable curved clamping arm 132 with the openings 133, is similar in shape to the clamping arm 128. The arm 132 has integral therewith the longitudinal rectangular member 134, which is bolted to the body portion 126 by the bolts 135. The clamping arms 128 and 132 are bolted to the bow of the vessel by the bolts 137.

To the lower end of the supporting bracket 125 is bolted the horizontal duplex support designated in its entirety by the numeral 140. See Figs. 1 and 5. The support 140 comprises the pair of similar rectangular horizontal members 141. Each of the member 141 at its outer end has integral therewith the inclined portion 142 with the cylindrical bulge 143 forming the opening 143a, and at its inner end terminates in the curved clamping arm 144. The members 141 of the duplex support are bolted to each other by the bolts 145. The inclined portions 142 are positioned on opposite sides of the projecting connecting member 127 and are bolted thereto by the bolts 146. To the inner faces of the sheathing 86 at the bow 84 is fastened, the strengthening bracket 147, and screws 148 fasten the arms 144 to the sheathing 86 and extend into said bracket 147.

To the lower face of the deck 88 is fastened a journal bearing housing 150, which has integral therewith the vertical bearings 152, 153 and the inclined bearing 154. A mitre gear 160 is fastened to the upper end of the rudder shaft 90. A vertical shaft 161 extends through the gland 162 secured to the deck 89 and through the bearing 152. A spur gear 164 is fastened to the lower end of the shaft 161. A shaft 165 extends from the bearing 153 and has fastened thereto the bevel gear 166. The bevel gear 166 meshes with the mitre gear 160. A spur gear 166a is fastened to the shaft 165 and meshes with the spur gear 164. An operating wheel 168 is fastened to the upper end of the shaft 161.

To the inner face of the bow portion of the vessel is fastened a circular separator disc 175 of metal having a tapered opening 176. To the disc 175 is detachably connected the annular clamping plate 180 by screws as shown. The plate 180 has integral therewith the annular clamping projection 181. The latter bears on the one-half portions 80, to detachably clamp the latter in place. A gasket 185 is interposed between the portions 80 and the disc 175 to prevent any water passing through the openings 85 and 176. The members 30 and 40 of the housing extend through the said openings 85 and 176. To operate the steering apparatus the operating wheel 168 is turned in the required direction. The rudder 103 swings with the movements of the wheel 168 to the required position.

It will be noted that the supporting bracket 125 and the duplex support 140 can be easily connected to the bow of a vessel by the bolts 137 and the screws 148, and that the strengthening bracket 147 into which the screws 148 enter prevents leakage when the duplex support 140 is removed. When the members 141 of the duplex support 140 are separated from each other by removing the bolts 110, 145, 146 and the screws 148, the rudder 103 can be easily removed from the bow of the vessel.

It will also be noted that the supporting bracket 125 with the duplex support 140 function as a protector for the rudder 103, and prevent ice and other objects floating in the water injuring the said rudder 103.

Various modifications may be made in the invention and the present exemplification is to be taken as illustrative and not limitative thereof.

Having described my invention I claim:

In a steering apparatus for a vessel the combination of a housing comprising a pair of tapered members extending through an opening of said vessel, each of said members having a one-half portion of a cylindrical longitudinal opening therein and opposite each other, each of said members having a pair of one-half portions of cylindrical cavities larger in diameter than said openings and in line therewith, a rudder shaft rotatively positioned in the longitudinal openings of said members, a pair of sleeves connected to the rudder shaft positioned in said cavities, supporting cages with rollers fixed in place to one of the members of the housing one below each of said sleeves, each of the sleeves bearing on the rollers in its adjacent cage and a rudder detachably connected to the rudder shaft.

GEORGE J. MANNFOLK.